Oct. 4, 1955  T. G. MYERS  2,719,738
SUBMERSIBLE SHAFT SEALING APPARATUS
Original Filed July 31, 1942  2 Sheets-Sheet 1

THOMAS G. MYERS,
INVENTOR.

BY John Flam
ATTORNEY.

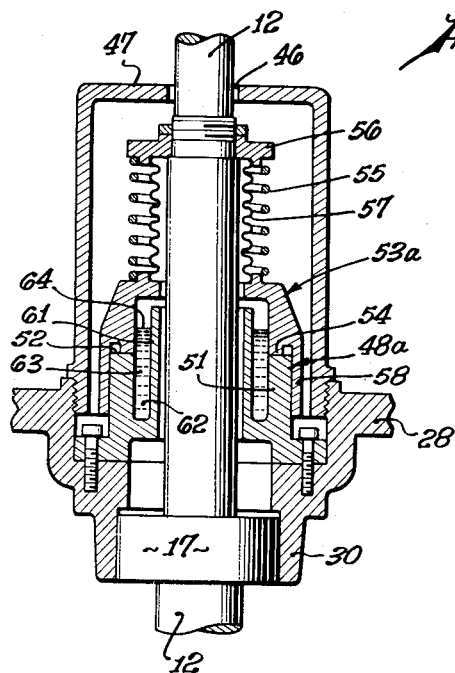
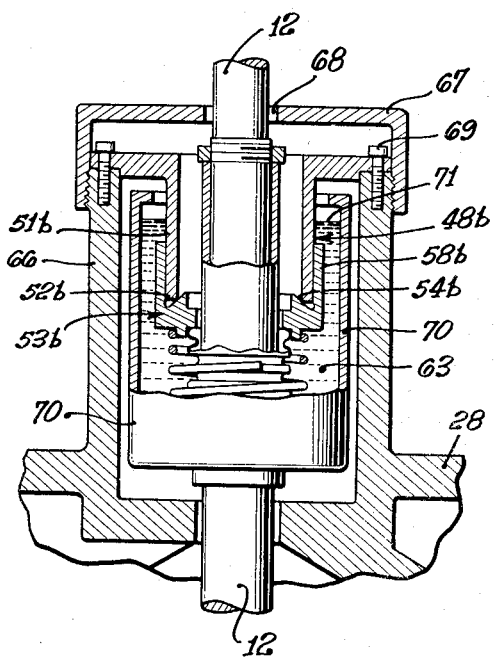
Thomas G. Myers,
INVENTOR.

United States Patent Office 2,719,738
Patented Oct. 4, 1955

2,719,738

SUBMERSIBLE SHAFT SEALING APPARATUS

Thomas G. Myers, Los Angeles, Calif., assignor to U. S. Electrical Motors, Inc., Los Angeles, Calif., a corporation of California Original application July 31, 1942, Serial No. 453,126. Divided and this application July 1, 1949, Serial No. 102,537

2 Claims. (Cl. 286—11)

This invention relates to submersible structures, such as submersible electric motors adapted to be lowered in a well for driving a pump directly connected to the motor.

This application is a division of the application of Thomas G. Myers, Serial No. 453,126, filed July 31, 1942, for "Submersible Structure," now abandoned, the latter application being a continuation-in-part of applications filed in the name of Thomas G. Myers on November 8, 1937, Serial No. 173,434, entitled "Submersible Structure," now Patent No. 2,318,181, Patent No. 2,379,648, Patent No. 2,381,615, and November 22, 1937, Serial No. 175,896, entitled "Sealed Submersible Structure," now Patent No. 2,309,707.

Usually the material pumped from the well is of such character as to be harmful to the motor should it enter into the motor casing. For example, when water is pumped, it should be kept away from the windings and contacting parts, so as not to cause electrical circuits to be improperly established, that would disable the motor. Also, such liquids usually carry grit, sand or other foreign matter that would quickly ruin the bearings inside of the motor. Accordingly, it is of considerable importance to segregate the casing interior as completely as possible from the liquid in which it is submerged.

It is one of the objects of this invention to make it possible, in a simple and effective manner, to insure against entry of the external liquid to the operating parts of the motor.

It has been proposed in the past to provide rotary seals of various kinds to effect this result, the seals being disposed around the shaft that necessarily must extend out of the motor casing. However, since the motor casing is subjected to varying liquid pressure, dependent upon the depth at which it is submerged, these ordinary seals have been found quite inadequate. It is another object of this invention to provide a multiple seal effect to insure to a greater degree against failure of the seal.

It is another object of this invention to utilize a rotating contact surface type of seal to supplement a liquid seal.

It is still another object of this invention to provide a combination liquid seal, such as mercury, and a seal formed by contact between a pair of relatively rotatable members, the liquid overlapping the region of contact.

A further object of the invention is to provide seals embodying relatively rotatable members, in which transverse flexure of the rotating shaft under certain load conditions is permissible, without disturbing the sealing contact between the relatively rotatable members. In this connection, the sealing contact is assured by arrangements providing a supplemental seal.

It is still another object of this invention to improve, in general, seals embodying such relatively rotatable members.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 3 is a view similar to Fig. 2, disclosing a modified form of sealing structure;

Fig. 4 is a view similar to Fig. 2, of still another form of sealed structure.

Figure 1:
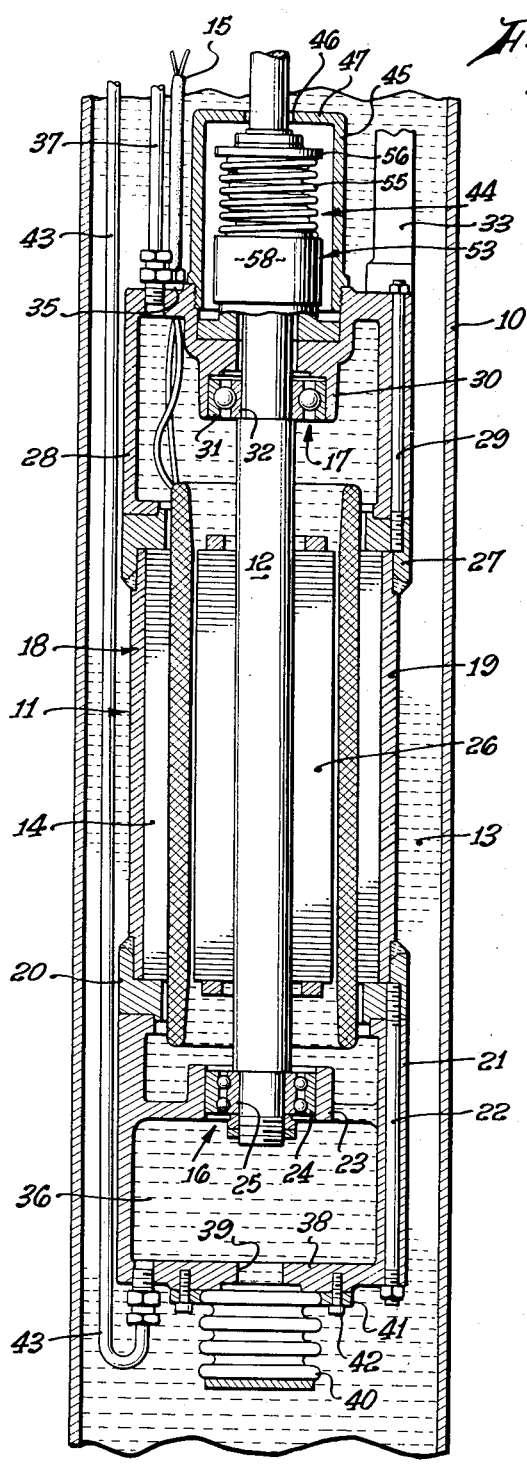
Figure 1 is a view, mainly in longitudinal section, of a structure embodying the invention, shown as submerged in a well.

The general character of the submersible structure is illustrated to best advantage in Fig. 1, wherein a well casing 10 has a submersible electric motor 11 disposed therein. This motor has an upwardly extending drive shaft 12, adapted to be connected, for example, to a pump (not shown) for pumping liquid from the well. The motor is shown as submerged in the well liquid 13, which is usually water.

The motor is most conveniently an induction motor of the squirrel cage type having primary or stator windings 14. These windings are adapted to be connected to a suitable source of power at the top of the well by means of a cable 15.

Since the liquid carries foreign particles or dirt, the bearings 16, 17 supporting the shaft 12 must be protected from this liquid. Furthermore, the windings 14 of the motor must also be kept separate from this liquid, otherwise the motor would be quickly disabled.

In order to secure these results, a casing structure 18 is provided, which is so arranged that the well liquid is excluded from the parts that need to be protected for all conditions of operation as regards well pressure, level of the liquid, etc. This casing structure is shown as formed by a cylindrical body 19 within which the stator 14 is supported. Secured to the lower end of the body 19, as by welding, is a lower collar 20, to which is fastened a bearing supporting housing 21, as by a series of threaded studs 22. The housing 21 provides a stationary collar 23 for supporting the outer race 24 of a radial ball bearing structure 16, the inner race 25 of which is secured on the shaft 12. The rotor laminations 26 are mounted on the shaft 12, as is well understood. Since the body 19 may be made from standard pipe, it is a simple matter to provide a body of the correct length for the rating of the particular motor involved.

An upper collar 27 is secured to the top of the body 19, as by welding, and has an upper bearing housing and casing head 28 secured thereto, as by studs 29, in a manner similar to that in which the lower bearing housing 21 is secured to the lower collar 20. The housing 28 provides an axially extending boss 30 serving to support the outer race 31 of a radial and thrust ball bearing structure 17, the inner race 32 of which is mounted on the shaft 12.

The shaft extends upwardly beyond the bearing for connection with a pump, not shown. The pump may be connected mechanically to the casing of the motor as by the aid of a foot structure 33, supported upon the head member 28. The shaft passes through the head 28 out of the casing structure, and it is apparent that precautions must be taken to prevent entry of liquid around the rotating shaft 12 at this place. The manner in which this is accomplished will be described shortly.

The cable 15 extends through a coupling member 35 in fluid tight relation with the top of the head 28, leading the connections from the windings 14 upwardly out of the casing structure 18.

It is preferred to have a filling of inert, lubricating liquid 36 within the casing structure. For this purpose lubricating oil is convenient, although other suitable liquids may be used. The liquid filling 36 in the casing may be replenished as desired, for example, by means of a supply pipe 37 connected to a passageway through the head member 28. The pipe may lead to the top of the well for connection to a source of the liquid under suitable pressure.

It is advantageous that liquid pressure inside the casing structure 18 be closely controlled. In this way, there is an assurance that the sealing means provided for the shaft 12 will not be subjected to any undue pressure differential. Substantial equalization of pressure between the liquid filling 36 in the motor casing and the exterior liquid 13 is secured by the aid of a structure now to be described. Thus, the bearing housing 21 has an extension. This extension is provided with a bottom flange 38 having a through aperture 39. This aperture is in communication with the interior of a metal bellows 40 extending downwardly from the flange 38. This metal bellows is placed in fluid tight connection with the flange 38, as by the aid of the flange 41 and screws 42. It is apparent that the pressure of the oil 36 within the casing 18 tends to expand the bellows 40 and the pressure of the water 13 outside of the casing tends to contract the bellows. Any variation in pressure, therefore, that would tend to arise, such as that due to temperature variation within the casing, would be equalized by operation of the bellows 40.

Since the interior of the casing 18 is closed at the bottom by the metal bellows 40, the renewal of the oil within the casing by withdrawal of the old oil, is accomplished by providing an emptying pipe 43 for the oil connected to the bottom of the casing, as by being in communication with the interior of the bearing housing extension 21. When it is desired to replace the old oil, therefore, a circulation is provided by the aid of appropriate pumping mechanism at the top of the well to force oil downwardly through the pipe 37 and to remove it through the pipe 43.

Figure 2:
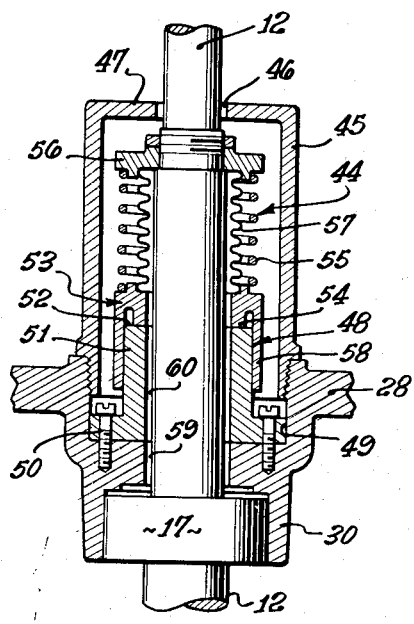
Fig. 2 is an enlarged fragmentary sectional view of the structure shown in Fig. 1, and particularly showing the construction of the seal for the submersible structure.

As disclosed most clearly in Fig. 2, the upper seal 44 around the vertical rotary shaft 12 is housed partly within the casing head 28 and partly within a tubular extension 45 threaded into the upper end of the head. There is an upper annular clearance aperture 46 between the shaft and the end wall 47 of the extension 45. A non-rotary sealing member 48 is fastened within a recess 49 in the head 28 of the casing, as by the aid of screws 50. This stationary sealing member has an upwardly directed cylindrical extension 51 provided with a top annular sealing surface 52. A rotary sealing member 53 has a downwardly directed annular sealing surface 54 in contact with the stationary sealing surface 52, the rotary member 53 being urged into sealing contact with the stationary member 48 by the aid of a helical spring 55 bearing against an upper collar 56 secured to the shaft, and also against the upper end of the rotary member 53. A flexible bellows 57, which may be made of metal, is secured to the collar 56 and to the rotary member 53, in order that the latter will be rotated with the shaft 12, and can be urged axially by both the bellows 57 and the spring 55 into firm annular sealing contact with the non-rotary member 48.

Under certain load conditions, transverse flexure of the shaft 12 is possible, which might disturb the accuracy of contact between the sealing faces 54, 52 on the rotary and non-rotary members 53, 48. To prevent such condition from occurring, the rotary member 53 is provided with a telescopic guide 58, in the form of a depending tubular extension or cylindrical skirt slidable on the exterior surface of the non-rotary extension 51. The telescopic member 58, may, if desired, make a close sliding fit on the cylindrical surface of the non-rotary member 51, providing a supplemental seal between the rotary and non-rotary members 53, 48, giving further assurance against leakage between the interiors of the rotary and non-rotary members and their exteriors.

As was stated above, an annular clearance aperture 46 is provided between the shaft 12 and the end portion 47 of the tubular casing extension 45. Similar annular clearance spaces 59, 60, of substantial extent, are provided between the shaft 12 and head 28, and between the inner surfaces of the rotary and non-rotary members and the exterior of the shaft. Because of such clearance spaces, and the fact that the rotary member 53 is coupled to the shaft 12 by the flexible bellows 57, the shaft can flex transversely of its axis without requiring corresponding shifting of the rotary member 53 transversely of its axis. As a matter of fact, the telescopic guide 58 on the rotary member 53, by fitting comparatively closely over the tubular extension 51, is prevented from flexing, and is held coaxial with the latter member, in order to insure proper alignment and engagement between the various sealing surfaces 52, 54 at all times.

The form of seal disclosed in Fig. 3 is essentially the same as the one illustrated in Fig. 2, except that a supplemental heavy sealing liquid is provided. The rotary and non-rotary sealing members 53a, 48a are disposed outwardly from the shaft 12, to allow space for an inner annular flange or container 61 to extend upwardly from the non-rotary member 48a. The inner surface of this container 61 is spaced substantially from the periphery of the shaft 12, to permit flexing of the shaft, under certain load conditions, without interference from the container.

The container 61 extends upwardly to a point substantially above the location of the annular sealing faces 54, 52 on the rotary and non-rotary members. It is also spaced inwardly from the inner cylindrical walls of these members to form an annular chamber 62 adapted to contain a heavy sealing liquid 63, such as mercury or carbon tetrachloride. This annular chamber 62 is filled with such liquid to a point 64 substantially above the sealing faces 52, 54, so as to provide a heavy liquid seal completely around the circumference of the contacting sealing faces.

The sealing liquid 63 is in contact with the liquid 36 filling the casing 18. Such liquid is prevented from communicating with the well fluid by at least two, and possibly three, different seals. One seal is provided by the heavy liquid 63; the second seal by the annular contacting faces 52, 54; and the third seal by the cylindrical contacting faces on the rotary and non-rotary member portions 58, 51, if such faces are closely fitted to form companion sealing surfaces.

In the form of invention disclosed in Fig. 4, the sealing arrangement is inverted somewhat with respect to the arrangements shown in Figs. 2 and 3, and the heavy sealing liquid 63 is provided on the exterior of the rotary and non-rotary members 53b, 48b, instead of on their interiors. Thus, the casing has an upwardly directed tubular extension 66 provided with an upper cap 67 threaded thereon, and having a clearance aperture 68 around the rotatable shaft 12. The non-rotary member 48b is secured to the upper end of the casing extension 66 by screws 69, or the like, and has a depending cylindrical non-rotary sealing member 51b, whose lower annular face 52b is adapted to contact a tapered seat or face 54b on the rotary member 53b, carried for rotation with the shaft 12 through the agency of a metal bellows 57. The annular faces 54b, 52b of the rotary and non-rotary members are urged into contact with one another by aid of a helical spring 55, as before.

Proper alignment between the faces 54b, 52b is assured by an upwardly extending telescopic member 58b on the rotary member disposed over the cylindrical exterior of the non-rotary member 51b. If desired, the telescopic fit may be close so as to provide a supplemental cylindrical seal. As in the other forms of the invention, there is a substantial annular clearance space provided between the shaft 12 and the sealing members 48b, 53b, to allow transverse flexure of the shaft without disturbing the sealing contact between the members.

A liquid seal 63 is provided around the exterior of the rotary and non-rotary members 53b, 48b. Such sealing liquid is disposed within a cup or container 70 secured to the shaft 12, and extending upwardly along the sealing members to a point substantially above the upper end of the rotary telescopic member 58b. The space within the cup is filled with the sealing liquid 63 to a level 71 substantially above the upper end of the telescopic member 58b, in order to prevent the liquid filling 36 in the casing from being able to leak out into the well fluid 13, or to prevent reverse leakage of the well fluid into the casing.

In Fig. 4, the liquid filling 36 in the casing can be pressurized through the pipes 37, 43, and such pressure will act through the liquid filling 36 upon the rotary sealing member 53b, to urge its annular seat 54b more firmly into engagement with the companion seat 52b on the non-rotary member 48b.

The inventor claims:

1. In a seal structure for a submersible structure: a casing segregating an interior space from an exterior space; a rotary shaft extending upwardly from said casing into the exterior space; a non-rotary member surrounding said shaft and carried by the casing, said non-rotary member having an inner annular flange extending downwardly, the interior of said flange being in communication with said exterior space; a rotary member secured to said shaft for rotation therewith, said rotary member having an annular flange extending upwardly and telescopically receiving said inner annular flange of said non-rotary member, and in sealing relationship thereto, said rotary member having an annular tapered sealing surface in engagement with the end of said inner annular flange of said non-rotary member; a cup member carried by said shaft and extending upwardly, said cup member defining a container the exterior of which is in communication with said interior space and surrounding said rotary and non-rotary members, the upper edges of said container extending above said annular flange of said rotary member; and a high specific gravity sealing fluid in said cup member and having a level above said annular flange of said rotary member.

2. In a seal structure for a submersible structure: a casing segregating an interior space from an exterior space; a rotary shaft extending upwardly from said casing into the exterior space; a non-rotary member surrounding said shaft and carried by the casing, said non-rotary member having an inner annular flange extending downwardly, there being substantial clearance between the interior of said flange and said shaft, the interior of said flange being in communication with said exterior space; a rotary member having an annular flange extending upwardly and telescopingly receiving said inner annular flange of said non-rotary member, and in sealing relationship thereto, said telescoping flanges aligning said rotary and non-rotary members; an expansible flexible member secured to said shaft at one end thereof and secured to said rotary member at the other end thereof, and carrying said rotary member for rotation together with said shaft; said rotary member having an annular tapered sealing surface in engagement with the end of said inner annular flange of said non-rotary member; a cup member carried by the shaft and extending upwardly, said cup member defining a container the exterior of which is in communication with said interior space, said cup member surrounding said flexible member and said rotary and non-rotary members, the upper edges of said container extending above said annular flange of said rotary member; resilient means urging said rotary member toward said non-rotary member; and a high specific gravity sealing fluid in said cup member and having a level above said annular flange of said rotary member, the surface of said fluid at said level being in communication with said interior space.

References Cited in the file of this patent

UNITED STATES PATENTS

| | | |
|---|---|---|
| 1,363,378 | Vuilleumier | Dec. 28, 1920 |
| 1,845,363 | Thompson | Feb. 16, 1932 |
| 1,850,571 | Shively | Mar. 22, 1932 |
| 1,989,548 | Coberly | Jan. 29, 1935 |
| 2,035,073 | Karrer | Mar. 24, 1936 |
| 2,057,381 | Kenney et al. | Oct. 13, 1936 |
| 2,354,874 | Myers | Aug. 1, 1944 |
| 2,381,615 | Myers | Aug. 7, 1945 |

FOREIGN PATENTS

| | | |
|---|---|---|
| 484,628 | Germany | Oct. 17, 1929 |
| 664,854 | France | Apr. 29, 1929 |